(12) United States Patent
Peng

(10) Patent No.: US 11,422,843 B2
(45) Date of Patent: Aug. 23, 2022

(54) VIRTUAL MACHINE MIGRATION METHOD AND APPARATUS HAVING AUTOMATIC USER REGISTRATION AT A DESTINATION VIRTUAL MACHINE

(71) Applicant: Huawei Cloud Computing Technologies Co., Ltd., Gui'an New District (CN)

(72) Inventor: Qingxiang Peng, Xi'an (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 427 days.

(21) Appl. No.: 16/672,222

(22) Filed: Nov. 1, 2019

(65) Prior Publication Data

US 2020/0065133 A1    Feb. 27, 2020

Related U.S. Application Data

(63) Continuation of application No. 15/449,857, filed on Mar. 3, 2017, now Pat. No. 10,489,143, which is a (Continued)

(30) Foreign Application Priority Data

Sep. 4, 2014    (CN) .......................... 201410448483.1

(51) Int. Cl.
G06F 9/455    (2018.01)
G06F 9/445    (2018.01)

(52) U.S. Cl.
CPC .......... *G06F 9/45558* (2013.01); *G06F 9/445* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

2007/0083917 A1    4/2007  Peterson et al.
2007/0220248 A1    9/2007  Bittlingmayer et al.
(Continued)

FOREIGN PATENT DOCUMENTS

CN    101876921 A    11/2010
CN    102567075 A    7/2012
(Continued)

OTHER PUBLICATIONS

Zhao et al, "Experimental Study of Virtual Machine Migration in Support of Reservation of Cluster Resources," Virtualization technology in distributed computing, XP055550321, pp. 1-8 (Jan. 1, 2007).

*Primary Examiner* — Michael W Ayers
(74) *Attorney, Agent, or Firm* — Leydig, Voit & Mayer, Ltd.

(57) ABSTRACT

A virtual machine migration method and apparatus are provided, which pertain to the field of computer technologies. The method includes: obtaining a first mapping relationship, pre-stored on a source cloud platform, between a source virtual machine (VM) and a specified user when data in the source VM is migrated to a destination VM; configuring the destination VM and the specified user to form a second mapping relationship according to the obtained first mapping relationship; and storing the second mapping relationship on a destination cloud platform. Therefore, a user that has registered on the source VM can log in to a virtual desktop corresponding to the destination VM and does not need to register on the destination VM again.

19 Claims, 3 Drawing Sheets

Related U.S. Application Data continuation of application No. PCT/CN2015/083215, filed on Jul. 2, 2015.

(56) References Cited

U.S. PATENT DOCUMENTS

| | | |
|---|---|---|
| 2008/0040714 A1 | 2/2008 | Wheeler et al. |
| 2008/0134177 A1 | 6/2008 | Fitzgerald et al. |
| 2010/0192214 A1 | 7/2010 | Ohno et al. |
| 2010/0257269 A1 | 10/2010 | Clark |
| 2011/0246669 A1 | 10/2011 | Kanada et al. |
| 2011/0265084 A1 | 10/2011 | Knowles et al. |
| 2011/0314155 A1 | 12/2011 | Narayanaswamy et al. |
| 2013/0073703 A1 | 3/2013 | Das et al. |
| 2013/0085989 A1 | 4/2013 | Nayyar et al. |
| 2013/0219043 A1 | 8/2013 | Steiner et al. |
| 2013/0227564 A1 | 8/2013 | Asayama |
| 2013/0262390 A1* | 10/2013 | Kumarasamy ...... H04L 67/2804 707/649 |
| 2014/0007085 A1 | 1/2014 | Campion et al. |
| 2014/0019621 A1* | 1/2014 | Khan ................... H04L 47/781 709/226 |
| 2014/0040892 A1* | 2/2014 | Baset ................. G06F 9/45558 718/1 |
| 2014/0149591 A1* | 5/2014 | Bhattacharya .... H04L 29/08144 709/226 |
| 2014/0229944 A1 | 8/2014 | Wang et al. |
| 2014/0258533 A1 | 9/2014 | Antony |
| 2015/0339150 A1* | 11/2015 | Yanagisawa ........ G06F 9/45558 718/1 |

FOREIGN PATENT DOCUMENTS

| | | |
|---|---|---|
| CN | 102571698 A | 7/2012 |
| CN | 102821158 A | 12/2012 |
| CN | 103399778 A | 11/2013 |
| CN | 104239122 A | 12/2014 |
| CN | 104281484 A | 1/2015 |

\* cited by examiner

VIRTUAL MACHINE MIGRATION METHOD AND APPARATUS HAVING AUTOMATIC USER REGISTRATION AT A DESTINATION VIRTUAL MACHINE

CROSS-REFERENCE TO RELATED APPLICATION

This application is a continuation of U.S. patent application Ser. No. 15/449,857, filed on Mar. 3, 2017, which is a continuation of International Application No. PCT/CN2015/083215, filed on Jul. 2, 2015. The International Application claims priority to Chinese Patent Application No. 201410448483.1, filed on Sep. 4, 2014. The disclosures of the aforementioned applications are hereby incorporated by reference in their entireties.

TECHNICAL FIELD

Embodiments of the present disclosure relate to the field of computer technologies, and in particular, to a virtual machine migration method and apparatus.

BACKGROUND

A VM (virtual machine) refers to a complete software-simulated computer system that has full hardware system functions and that runs in an absolutely isolated environment. In the prior art, users obtain, by logging in to a VM on a cloud computing platform (cloud platform for short), resources and services shared on the cloud platform, to complete their work. Currently, there are mainly two usage scenarios of the VM on the cloud platform: One is a virtual desktop, and the other is a virtual server. A function of the virtual desktop is to allow a user to carry out daily office work by using the VM on the cloud platform instead of using a physical machine; a function of the virtual server is to build a service system such as a database or a network for a virtual desktop user by using the VM. In some scenarios, for example, when an existing cloud platform is no longer used and is replaced with a new cloud platform, or due to work requirements, a virtual desktop user on a cloud platform cannot log in to a VM on the original cloud platform to carry out work, and needs to log in to another cloud platform to carry out the original work, migration needs to be performed on the VM on the original cloud platform.

According to a current VM migration implementation solution, data in a source VM disk is copied by using an agent plug-in installed in a VM on a source cloud platform (source VM for short) and transmitted to a disk in a VM on a destination cloud platform (destination VM for short), and migration from the source VM to the destination VM is complete until all data in the source VM disk is copied to the destination VM disk. The data in the source VM includes an operating system, and a database, a network, or application software that implements various services required by a user.

During implementation of the present disclosure, the inventor finds that the prior art has at least the following problems:

According to the existing VM migration implementation solution, data migration can be performed only on a VM corresponding to the virtual server—one of the two usage scenarios of the VM on the cloud platform, to migrate all the data in the source VM to the destination VM. However, after data migration is performed on a VM corresponding to the other application scenario of the VM on the cloud platform, specifically, performed on a VM corresponding to the virtual desktop, when a virtual desktop user wants to use the virtual desktop corresponding to the VM in which data has been migrated, because no user name is stored on a destination VM, the user cannot log in to the destination VM by using a user name that is set on the source VM, and needs to register a new user name. Operations are complex, and user experience of the virtual desktop user is degraded.

SUMMARY

To resolve a problem in the prior art, embodiments of the present disclosure provide a virtual machine migration method and apparatus. The technical solutions are as follows:

According to a first aspect, the present disclosure provides a virtual machine migration method, where the method includes:

obtaining a first mapping relationship, pre-stored on a source cloud platform, between a source VM and a specified user when data in the source VM is migrated to a destination VM;

configuring a second mapping relationship between the destination VM and the specified user according to the obtained first mapping relationship between the source VM and the specified user; and storing the second mapping relationship on a destination cloud platform.

In a first possible implementation manner of the first aspect, the configuring a second mapping relationship between the destination VM and the specified user according to the obtained first mapping relationship between the source VM and the specified user includes:

obtaining an identifier of the destination VM and a correspondence between an identifier of the source VM and a user identifier of the specified user in the first mapping relationship; and mapping the identifier of the destination VM with the user identifier of the specified user according to the correspondence between the identifier of the source VM and the user identifier of the specified user, to form the second mapping relationship.

In a second possible implementation manner of the first aspect, the method further includes:

obtaining an identifier of the source VM and an identifier of the destination VM;

setting the source VM and the destination VM to a suspended state; and migrating the data in the source VM to the destination VM according to the obtained identifier of the source VM and the obtained identifier of the destination VM.

With reference to the second possible implementation manner of the first aspect, in a third possible implementation manner, the migrating the data in the source VM to the destination VM according to the obtained identifier of the source VM and the obtained identifier of the destination VM includes:

copying, according to the obtained identifier of the source VM, data in a VM corresponding to the identifier of the source VM; and transmitting the copied data in the source VM to a VM corresponding to the identifier of the destination VM.

In a fourth possible implementation manner of the first aspect, the method further includes:

shutting down the source VM.

According to a second aspect, the present disclosure provides a virtual machine migration apparatus, where the apparatus includes:

a first obtaining module, adapted to obtain a first mapping relationship, pre-stored on a source cloud platform, between a source VM and a specified user when data in the source VM is migrated to a destination VM;

a first processing module, adapted to configure a second mapping relationship between the destination VM and the specified user according to the obtained first mapping relationship between the source VM and the specified user; and a storage module, adapted to store the second mapping relationship on a destination cloud platform.

In a first possible implementation manner of the second aspect, the first processing module is adapted to:

obtain an identifier of the destination VM and a correspondence between an identifier of the source VM and a user identifier of the specified user in the first mapping relationship; and map the identifier of the destination VM with the user identifier of the specified user according to the correspondence between the identifier of the source VM and the user identifier of the specified user, to form the second mapping relationship.

In a second possible implementation manner of the second aspect, the apparatus further includes:

a second obtaining module, adapted to obtain an identifier of the source VM and an identifier of the destination VM;

a second processing module, adapted to set the source VM and the destination VM to a suspended state; and a third processing module, adapted to migrate the data in the source VM to the destination VM according to the obtained identifier of the source VM and the obtained identifier of the destination VM.

With reference to the second possible implementation manner of the second aspect, in a third possible implementation manner, the third processing module is adapted to:

copy, according to the obtained identifier of the source VM, data in a VM corresponding to the identifier of the source VM; and transmit the copied data in the source VM to a VM corresponding to the identifier of the destination VM.

In a fourth possible implementation manner of the second aspect, the apparatus further includes:

a recycling module, adapted to shut down the source VM.

According to a third aspect, the present disclosure provides a virtual machine migration apparatus, where the virtual machine migration apparatus includes a memory, a processor, and one or more programs, the one or more programs are stored in the memory, and are configured so as to be executed by the processor, and the one or more programs include instructions used to perform the following operations:

obtaining a first mapping relationship, pre-stored on a source cloud platform, between a source VM and a specified user when data in the source VM is migrated to a destination VM;

configuring a second mapping relationship between the destination VM and the specified user according to the obtained first mapping relationship between the source VM and the specified user; and storing the second mapping relationship on a destination cloud platform.

The technical solutions provided in the embodiments of the present disclosure bring about the following beneficial effects:

According to the virtual machine migration method and apparatus provided in the embodiments of the present disclosure, when data in a source VM is migrated to a destination VM, the destination VM and a specified user are configured to form a second mapping relationship according to an obtained first mapping relationship between the source VM and the specified user, and the formed second mapping relationship is stored on the destination cloud platform. Therefore, after data migration is performed on a source VM corresponding to a virtual desktop, a virtual desktop user can log in, by using a user name that is set on the source VM, to a virtual desktop corresponding to a destination VM to which data is migrated, and does not need to register a new user name. Operations are simple, and user experience of the virtual desktop user is improved.

BRIEF DESCRIPTION OF DRAWINGS

The following briefly describes the accompanying drawings.

Embodiments of the present disclosure have been clearly shown in the accompanying drawings, and are described below in more detail. These accompanying drawings and literal descriptions are not intended to limit the scope of a conception of the present disclosure by any means, but to illustrate the concept of the present disclosure with reference to particular embodiments for a person skill in the art.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Unless otherwise defined, the technical terms or scientific terms used herein have normal meaning understood by a person of ordinary skill in the art to which the present disclosure belongs. The words "first", "second", and the like used in the descriptions and the claims of this patent application of the present disclosure do not indicate the sequence, the number or the importance but are only used for distinguishing between different components. Similarly, the words "a", "an", and the like also do not indicate the number but only indicate at least one. The words "connection", "connected", and the like are not limited to physical or mechanical connection but may include electrical connection, either directly or indirectly. The words "upper", "lower", "left", "right", and the like only indicate the relative position relationship which is correspondingly changed when the absolute position of a described object is changed.

Figure 1:
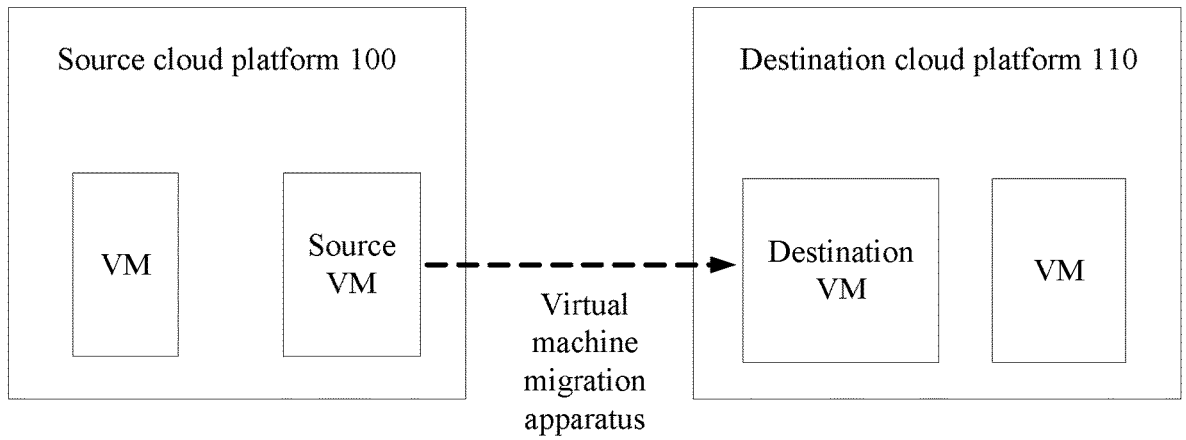
FIG. 1 is a schematic structural diagram of an implementation environment involved in a virtual machine migration method according to an embodiment of the present disclosure.

FIG. 1 provides a schematic structural diagram of an implementation environment involved in a virtual machine migration method according to an embodiment of the present disclosure. The environment includes a source cloud platform 100 and a destination cloud platform 110 that receives a migrated VM on the source cloud platform 100.

Both the source cloud platform 100 and the destination cloud platform 110 include multiple servers (not shown in the figure), and each server includes a given quantity of VMs. These servers may be local, or may be distributed at different locations in a network. A VM included in each server may be a virtual desktop, a virtual server, or a combination of a virtual desktop and a virtual server.

When VM data migration is performed, data in a source VM on the source cloud platform 100 is migrated to the destination cloud platform 110 by using a virtual machine migration apparatus.

The virtual machine migration apparatus is adapted to migrate the data in the source VM to a destination VM according to an obtained identifier of the source VM, an obtained identifier of the destination VM, and the obtained data in the source VM.

The virtual machine migration apparatus may be disposed on a server that is specially configured for VM migration and that is independent of all servers on the source cloud platform 100 and the destination cloud platform 110, or may be disposed, in a form of a function module, on the source cloud platform 100 or the destination cloud platform 100.

According to the virtual machine migration method provided in the embodiments of the present disclosure, a source cloud platform and a destination cloud platform are different cloud platforms, in other words, data migration from a source VM to a destination VM is performed between the two cloud platforms.

Embodiment 1

Figure 2:
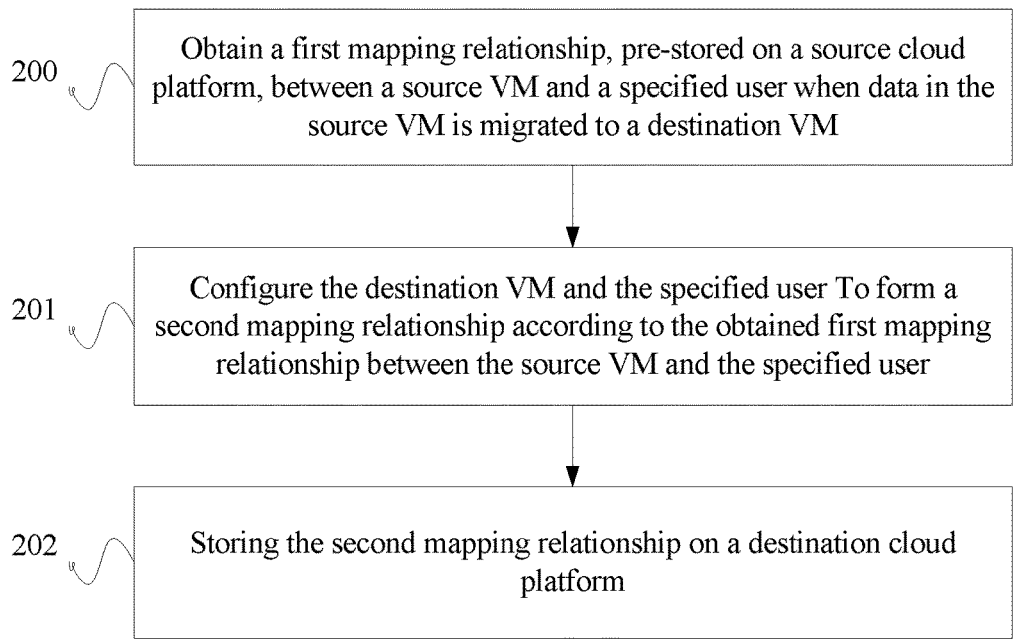
FIG. 2 is a flowchart of a virtual machine migration method according to Embodiment 1 of the present disclosure.

Referring to FIG. 2, an embodiment of the present disclosure provides a virtual machine migration method. The method includes the following steps:

Step 200: Obtain a first mapping relationship, pre-stored on a source cloud platform, between a source VM and a specified user when data in the source VM is migrated to a destination VM.

Step 201: Configure a second mapping relationship between the destination VM and the specified user according to the obtained first mapping relationship between the source VM and the specified user.

Step 202: Store the second mapping relationship on a destination cloud platform.

According to the foregoing process, after data migration is performed on a source VM corresponding to a virtual desktop, a virtual desktop user can log in, by using a user name that is set on the source VM, to a virtual desktop of a destination VM to which data is migrated, and does not need to register a new user name. Operations are simple.

The generated second mapping relationship is stored in a mapping relationship table or a service database that is preset on the destination cloud platform, or may be stored in another apparatus that can store a mapping relationship between a VM and a specified user. Details are not described herein.

Embodiment 2

Figure 3:
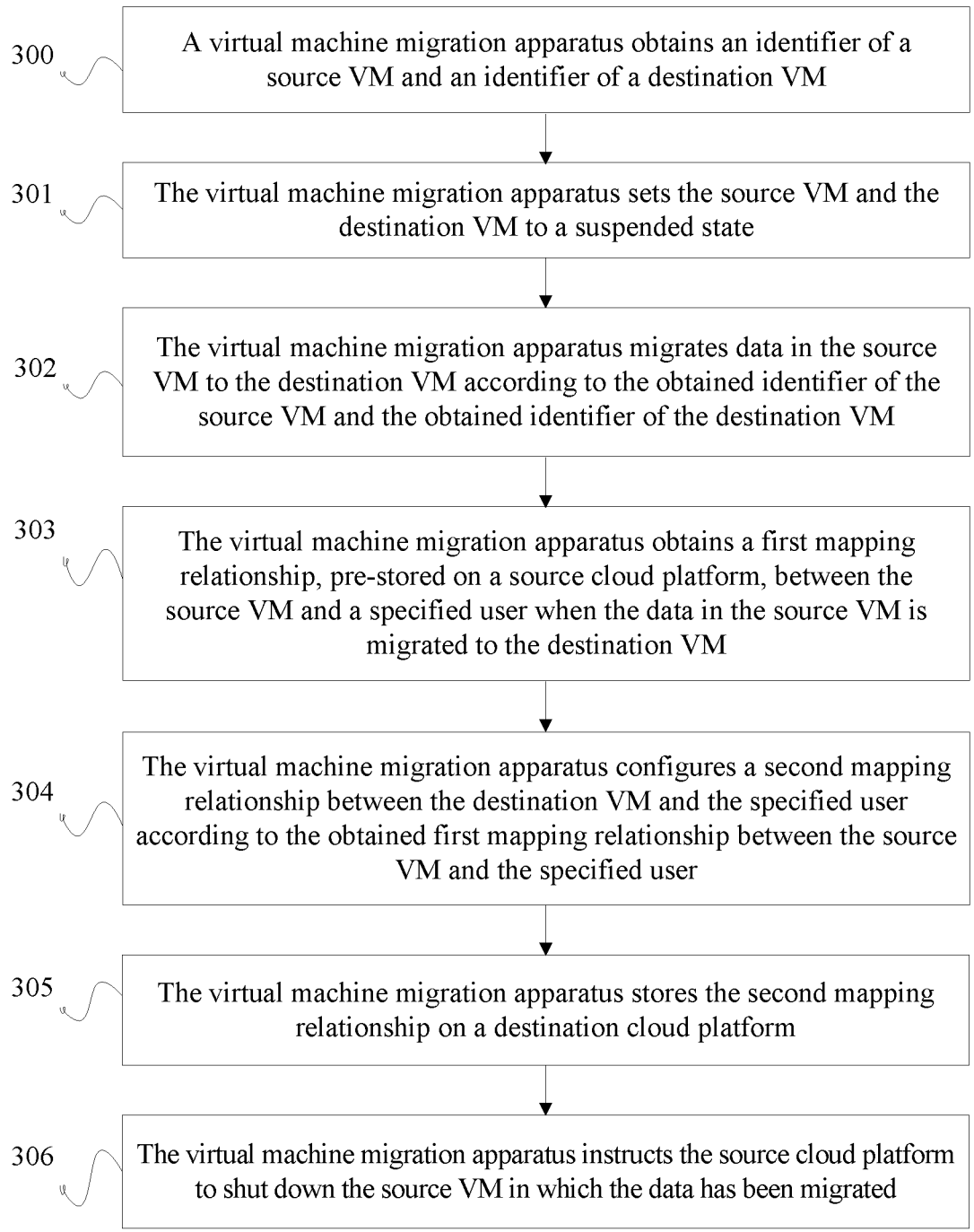
FIG. 3 is a flowchart of a virtual machine migration method according to Embodiment 2 of the present disclosure.

Referring to FIG. 3, an embodiment of the present disclosure provides a virtual machine migration method, so as to migrate data in a source VM to a destination VM by using a virtual machine migration apparatus. The method includes the following steps.

Step 300: The virtual machine migration apparatus obtains an identifier of the source VM and an identifier of the destination VM.

Specifically, the virtual machine migration apparatus obtains the identifier of the source VM from a source cloud platform and obtains the identifier of the destination VM from a destination cloud platform. The identifier of the source VM on the source cloud platform and the identifier of the destination VM on the destination cloud platform are both entered into the source cloud platform and the destination cloud platform in advance by an administrator before the data in the source VM is migrated to the destination VM.

Further, in addition to the identifier of the source VM and the identifier of the destination VM, the virtual machine migration apparatus may obtain a host name of the source VM from the source cloud platform and obtain a host name of the destination VM from the destination cloud platform, to further determine the source VM and the destination VM. The obtained identifier of the source VM, the obtained host name of the source VM, the obtained identifier of the destination VM, and the obtained host name of the destination VM are entered into the virtual machine migration apparatus.

For example, the identifier of the source VM is A, and the identifier of the destination VM is B. Before the data in the source VM on the source cloud platform is migrated to the destination VM on the destination cloud platform, preparation is made for VM migration, specifically, the identifier A of the source VM is obtained from the source cloud platform, and the identifier B of the destination VM is obtained from the destination cloud platform.

Further, storage space of the destination VM and storage space of the source VM are consistent in size and configuration.

Step 301: The virtual machine migration apparatus sets the source VM and the destination VM to a suspended state.

Specifically, the suspended state of the source VM and the destination VM in this step refers to: The virtual machine migration apparatus sets the source VM and the destination VM to a state in which a user cannot perform operations. As a result, in a process of migrating the data in the source VM to the destination VM, the user cannot operate the data in the source VM, thereby ensuring data consistency between the destination VM and the source VM after VM migration is complete, ensuring that all data in the source VM can be migrated to the destination VM once, ensuring a success rate of virtual machine migration, and improving data migration efficiency of the source VM.

Certainly, alternatively, before performing data migration on the source VM, the virtual machine migration apparatus may set the source VM and the destination VM to a maintenance mode by using an instruction, so that the source VM and the destination VM are in a state in which a user cannot perform operations. Then the virtual machine migration apparatus migrates the data from the source VM to the destination VM. In addition to the foregoing described manners, the source VM and the destination VM may be set, in another manner, to a state in which a user cannot perform operations. Details are not described herein.

Step 302: The virtual machine migration apparatus migrates the data in the source VM to the destination VM according to the obtained identifier of the source VM and the obtained identifier of the destination VM.

Specifically, this step includes:

copying, by virtual machine migration apparatus according to the obtained identifier of the source VM, data in a VM corresponding to the identifier of the source VM; and transmitting, by virtual machine migration apparatus, the copied data in the source VM to a VM corresponding to the identifier of the destination VM.

In a process of transmitting the data in the source VM to the destination VM, the virtual machine migration apparatus sends a virtualized underlying command to the source platform, copies data in a disk of the source VM, and then sends the copied data block to the destination VM.

Preferably, in a process of migrating the data in the source VM to the destination VM, the virtual machine migration apparatus may copy a data block of a specific size in a disk of the source VM, send the copied data block to the destination VM, and then continue to copy a data block of a specific size in a disk of the source VM and transmit the data block to the destination VM, until all the data in the source VM is copied to the destination VM.

Step 303: The virtual machine migration apparatus obtains a first mapping relationship, pre-stored on a source cloud platform, between the source VM and a specified user when the data in the source VM is migrated to the destination VM.

Specifically, the first mapping relationship includes a correspondence between the identifier of the source VM and an identifier of the specified user. In an example in which the identifier of the source VM is A, a name of the specified user is Zhang San, and a user identifier of Zhang San is 003, a first mapping relationship between the source VM and the specified user Zhang San may be denoted as A-003.

The virtual machine migration apparatus may obtain the first mapping relationship from a mapping relationship table or a service database, for the source VM and the specified user, pre-stored on the source VM.

Step 304: The virtual machine migration apparatus configures a second mapping relationship between the destination VM and the specified user according to the obtained first mapping relationship between the source VM and the specified user.

Specifically, step 304 includes:

obtaining, by the virtual machine migration apparatus, an identifier of the destination VM and a correspondence between the identifier of the source VM and the user identifier of the specified user; and mapping, by the virtual machine migration apparatus, the identifier of the destination VM with the user identifier of the specified user according to the correspondence between the identifier of the source VM and the user identifier of the specified user, to form the second mapping relationship.

The user identifier of the specified user includes a password used by the specified user to log in to the source VM.

Further, step 304 is further described by using an example in which the identifier of the source VM is A, the identifier of the destination VM is B, a name of the specified user is Zhang San, and a user identifier of Zhang San is 003.

The first mapping relationship may be denoted as A-003. A correspondence A-003 between the identifier A of the source VM and the user identifier 003 of the specified user Zhang San is obtained from the first mapping relationship, and the obtained identifier of the destination VM is B. A correspondence B-003 between the identifier B of the destination VM and the specified user Zhang San is formed according to the correspondence A-003 between the identifier A of the source VM and the specified user Zhang San and, the formed correspondence B-003 is used as the second mapping relationship.

Step 305: The virtual machine migration apparatus stores the second mapping relationship on the destination cloud platform.

Specifically, the virtual machine migration apparatus stores the second mapping relationship in a service database that is pre-stored on the destination cloud platform. The second mapping relationship between the destination VM and the specified user, formed according to the first mapping relationship that is between the source VM and the specified user and that is stored in the service database on the source cloud platform is stored in the service database on the destination cloud platform, so as to ensure consistency between the service database on the source cloud platform and the service database on the destination cloud platform after the VM data migration.

Step 306: The virtual machine migration apparatus instructs the source cloud platform to shut down the source VM.

Specifically, step 306 includes:

calling, by the virtual machine migration apparatus, an interface on the destination cloud platform to associate the destination VM with the specified user;

calling, by the virtual machine migration apparatus, an interface on the destination cloud platform to restart the destination VM, where the destination VM performs automatic registration after being restarted, and after the destination VM successfully performs registration, the destination cloud platform sends, to the virtual machine migration apparatus, information indicating successful registration of the destination VM; and calling, by the virtual machine migration apparatus, an interface on the source cloud platform to shut down the source VM after receiving the information that indicates successful registration of the destination VM and that is sent by the destination cloud platform.

According to the descriptions of step 306, resource usage on the source platform can be reduced by shutting down the source VM in which the data has been migrated and by recycling VM resources that are not used on the source platform. The recycled VM resources can be re-allocated when necessary, so that the VM resources on the source platform are configured more properly.

Based on the foregoing descriptions, according to the virtual machine migration method provided in this embodiment of the present disclosure, when data in a source VM is migrated to a destination VM, the destination VM and a specified user is configured to form a second mapping relationship according to an obtained first mapping relationship between the source VM and the specified user, and the formed second mapping relationship is stored on a destination cloud platform. Therefore, after data migration is performed on a source VM corresponding to a virtual desktop, a virtual desktop user can log in, by using a user name that is set on the source VM, to a virtual desktop corresponding to a destination VM to which data is migrated, and does not need to register a new user name. Operations are simple, and user experience of the virtual desktop user is improved.

Embodiment 3

Figure 4:
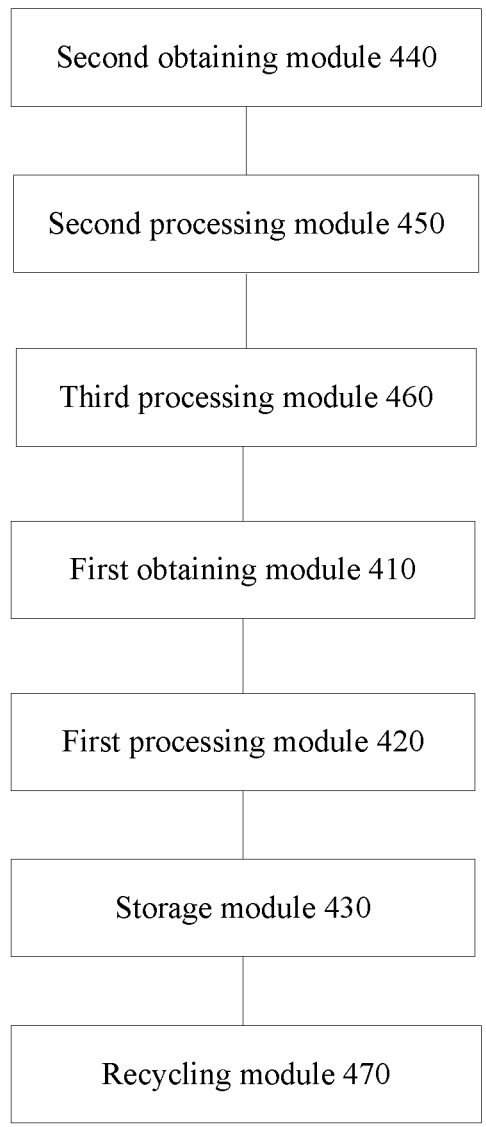
FIG. 4 is a schematic structural diagram of a virtual machine migration apparatus according to Embodiment 3 of the present disclosure.

Referring to FIG. 4, an embodiment of the present disclosure provides a virtual machine migration apparatus. The apparatus includes:

a first obtaining module 410, adapted to obtain a first mapping relationship, pre-stored on a source cloud platform, between a source VM and a specified user when data in the source VM is migrated to a destination VM;

a first processing module 420, adapted to configure a second mapping relationship between the destination VM and the specified user according to the obtained first mapping relationship between the source VM and the specified user; and a storage module 430, adapted to store the second mapping relationship on a destination cloud platform.

Specifically, the first processing module 410 is adapted to:

obtain an identifier of the destination VM and a correspondence between an identifier of the source VM and a user identifier of the specified user in the first mapping relationship; and map the identifier of the destination VM with the user identifier of the specified user according to the correspondence between the identifier of the source VM and the user identifier of the specified user, to form the second mapping relationship.

Further, the virtual machine migration apparatus further includes:

a second obtaining module 440, adapted to obtain an identifier of the source VM and an identifier of the destination VM;

a second processing module 450, adapted to set the source VM and the destination VM to a suspended state; and a third processing module 460, adapted to migrate the data in the source VM to the destination VM according to the obtained identifier of the source VM and the obtained identifier of the destination VM.

Specifically, the third processing module 460 is adapted to:

copy, according to the obtained identifier of the source VM, data in a VM corresponding to the identifier of the source VM; and transmit the copied data in the source VM to a VM corresponding to the identifier of the destination VM.

Further, the virtual machine migration apparatus further includes:

a recycling module 470, adapted to shut down the source VM.

It should be noted that, when the virtual machine migration apparatus provided in this embodiment of the present disclosure migrates data from a source VM to a destination VM, the division of the foregoing function modules is only used as an example. In an actual application, the foregoing function allocation can be implemented by different function modules according to a requirement, specifically, the internal structure of the apparatus is divided into different function modules to perform all or some of the foregoing functions described above. In addition, the virtual machine migration apparatus and system provided in this embodiment and the virtual machine migration method embodiments belong to a same conception. For a specific implementation process thereof, refer to the virtual machine migration method embodiments. Details are not described herein again.

Based on the foregoing descriptions, according to the virtual machine migration apparatus provided in this embodiment of the present disclosure, when data in a source VM is migrated to a destination VM, the destination VM and a specified user is configured to form a second mapping relationship according to an obtained first mapping relationship between the source VM and the specified user, and the formed second mapping relationship is stored on a destination cloud platform. Therefore, after data migration is performed on a source VM corresponding to a virtual desktop, a virtual desktop user can log in, by using a user name that is set on the source VM, to a virtual desktop corresponding to a destination VM to which data is migrated, and does not need to register a new user name. Operations are simple, and user experience of the virtual desktop user is improved.

Embodiment 4

Figure 5:
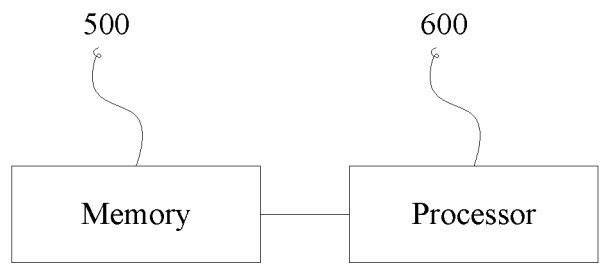
FIG. 5 is a schematic structural diagram of a virtual machine migration apparatus according to Embodiment 4 of the present disclosure.

Referring to FIG. 5, an embodiment of the present disclosure provides a virtual machine migration apparatus. The virtual machine migration apparatus includes a memory 500, a processor 600, and one or more programs. The one or more programs are stored in the memory 500, and are configured so as to be executed by the processor 600, and the one or more programs include instructions used to perform the following operations:

obtaining a first mapping relationship, pre-stored on a source cloud platform, between a source VM and a specified user when data in the source VM is migrated to a destination VM;

configuring a second mapping relationship between the destination VM and the specified user according to the obtained first mapping relationship between the source VM and the specified user; and storing the second mapping relationship on a destination cloud platform.

It should be noted that, when the virtual machine migration apparatus provided in this embodiment of the present disclosure migrates data from a source VM to a destination VM, the division of the foregoing function modules is only used as an example. In an actual application, the foregoing function allocation can be implemented by different function modules according to a requirement, specifically, the internal structure of the apparatus is divided into different function modules to perform all or some of the foregoing functions described above. In addition, the virtual machine migration apparatus and system provided in this embodiment and the virtual machine migration method embodiments belong to a same conception. For a specific implementation process thereof, refer to the virtual machine migration method embodiments. Details are not described herein again.

Based on the foregoing descriptions, according to the virtual machine migration apparatus provided in this embodiment of the present disclosure, when data in a source VM is migrated to a destination VM, the destination VM and a specified user is configured to form a second mapping relationship according to an obtained first mapping relationship between the source VM and the specified user, and the formed second mapping relationship is stored on a destination cloud platform. Therefore, after data migration is performed on a source VM corresponding to a virtual desktop, a virtual desktop user can log in, by using a user name that is set on the source VM, to a virtual desktop corresponding to a destination VM to which data is migrated, and does not need to register a new user name. Operations are simple, and user experience of the virtual desktop user is improved.

The sequence numbers in the foregoing embodiments of the present disclosure are only for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

Finally, it should be noted that the foregoing embodiments are only intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A virtual machine migration method, comprising:
   obtaining a first mapping relationship between a source virtual machine (VM) and a specified user, wherein the first mapping relationship is pre-stored on a source cloud platform, and data in the source VM is migrated to a destination VM;
   configuring a second mapping relationship between the destination VM and the specified user according to the obtained first mapping relationship between the source VM and the specified user;
   storing the second mapping relationship on a destination cloud platform;
   starting the destination VM on the destination cloud platform, wherein the destination VM performs automatic registration of the specified user; and
   shutting down the source VM on the source cloud platform after the data of the source VM has been migrated to the destination VM.

2. The virtual machine migration method according to claim 1, wherein the configuring the second mapping relationship between the destination VM and the specified user according to the obtained first mapping relationship between the source VM and the specified user comprises:
   obtaining an identifier of the destination VM;
   obtaining a correspondence between an identifier of the source VM and a user identifier of the specified user in the first mapping relationship; and
   mapping the identifier of the destination VM with the user identifier of the specified user according to the correspondence between the identifier of the source VM and the user identifier of the specified user, to form the second mapping relationship.

3. The virtual machine migration method according to claim 1, further comprising:
   obtaining an identifier of the source VM and an identifier of the destination VM;
   setting the source VM and the destination VM to a state in which a user cannot perform operations; and
   migrating the data in the source VM to the destination VM according to the obtained identifier of the source VM and the obtained identifier of the destination VM.

4. The virtual machine migration method according to claim 3, wherein the migrating the data in the source VM to the destination VM according to the obtained identifier of the source VM and the obtained identifier of the destination VM comprises:
   copying, according to the obtained identifier of the source VM, data in a VM corresponding to the identifier of the source VM; and
   transmitting the copied data in the source VM to a VM corresponding to the identifier of the destination VM.

5. The virtual machine migration method according to claim 2, wherein the identifier of the source VM and the identifier of the destination VM are pre-stored on the source cloud platform and the destination cloud platform, respectively.

6. The virtual machine migration method according to claim 3, wherein the obtaining the identifier of the source VM and the identifier of the destination VM comprises:
   obtaining the identifier of the source VM from the source cloud platform; and
   obtaining the identifier of the destination VM from the destination cloud platform.

7. A virtual machine migration apparatus, comprising:
   a processor; and
   a memory coupled to the processor and storing instructions for execution by the processor, wherein the instructions instruct the processor to:
   obtain a first mapping relationship between a source virtual machine (VM) and a specified user wherein the first mapping relationship is pre-stored on a source cloud platform, and data in the source VM is migrated to a destination VM;
   configure a second mapping relationship between the destination VM and the specified user according to the obtained first mapping relationship between the source VM and the specified user;
   store the second mapping relationship on a destination cloud platform;
   call an interface on the destination cloud platform to start the destination VM, wherein the destination VM performs automatic registration of the specified user; and
   call an interface on the source cloud platform to shut down the source VM after the data of the source VM has been migrated to the destination VM.

8. The virtual machine migration apparatus according to claim 7, wherein the instructions instruct the processor to:
   obtain an identifier of the destination VM;
   obtain a correspondence between an identifier of the source VM and a user identifier of the specified user in the first mapping relationship; and
   map the identifier of the destination VM with the user identifier of the specified user according to the correspondence between the identifier of the source VM and the user identifier of the specified user, to form the second mapping relationship.

9. The virtual machine migration apparatus according to claim 7, wherein the instructions instruct the processor to:
   obtain an identifier of the source VM and an identifier of the destination VM;
   set the source VM and the destination VM to a state in which a user cannot perform operations; and
   migrate the data in the source VM to the destination VM according to the obtained identifier of the source VM and the obtained identifier of the destination VM.

10. The virtual machine migration apparatus according to claim 9, wherein the instructions instruct the processor to:
    copy, according to the obtained identifier of the source VM, data in a VM corresponding to the identifier of the source VM; and
    transmit the copied data in the source VM to a VM corresponding to the identifier of the destination VM.

11. The virtual machine migration apparatus according to claim 7, wherein storage space of the destination VM and storage space of the source VM are consistent in size and configuration.

12. The virtual machine migration apparatus according to claim 9, wherein to migrate the data in the source VM to the destination VM, the instructions further instruct the processor to:
- copy a data block of a specific size in a disk of the source VM;
- send the copied data block to the destination VM;
- continue to copy a data block of a specific size in a disk of the source VM; and
- continue to send the data block to the destination VM, until all the data in the source VM is copied to the destination VM.

13. The virtual machine migration apparatus according to claim 10, wherein to transmit the copied data in the source VM to a VM corresponding to the identifier of the destination VM, the instructions further instruct the processor to:
- send a virtualized underlying command to the source cloud platform;
- copy data in a disk of the source VM; and
- send the copied data block to the destination VM.

14. A computer program product, comprising a non-transitory computer-readable medium storing computer executable instructions that when executed by a processor instruct the processor to:
- obtain a first mapping relationship between a source virtual machine (VM) and a specified user, wherein the first mapping relationship is pre-stored on a source cloud platform, and data in the source VM is migrated to a destination VM;
- configure a second mapping relationship between the destination VM and the specified user according to the obtained first mapping relationship between the source VM and the specified user;
- store the second mapping relationship on a destination cloud platform;
- start the destination VM on the destination cloud platform, wherein the destination VM performs automatic registration of the specified user; and
- shut down the source VM on the source cloud platform after the data of the source VM has been migrated to the destination VM.

15. The computer program product according to claim 14, wherein the instructions instruct the processor to:
- obtain an identifier of the destination VM;
- obtain a correspondence between an identifier of the source VM and a user identifier of the specified user in the first mapping relationship; and
- map the identifier of the destination VM with the user identifier of the specified user according to the correspondence between the identifier of the source VM and the user identifier of the specified user, to form the second mapping relationship.

16. The computer program product according to claim 14, wherein the instructions instruct the processor to:
- obtain an identifier of the source VM and an identifier of the destination VM;
- set the source VM and the destination VM to a state in which a user cannot perform operations; and
- migrate the data in the source VM to the destination VM according to the obtained identifier of the source VM and the obtained identifier of the destination VM.

17. The computer program product according to claim 16, wherein the instructions instruct the processor to:
- copy, according to the obtained identifier of the source VM, data in a VM corresponding to the identifier of the source VM; and
- transmit the copied data in the source VM to a VM corresponding to the identifier of the destination VM.

18. The computer program product according to claim 14, wherein to shut down the source VM after data of the source VM has been migrated to the destination VM, the instructions further instruct the processor to:
- after the destination VM successfully performs the registration, send, by the destination cloud platform, information indicating the successful registration.

19. The computer program product according to claim 14, wherein the instructions further instruct the processor to:
- obtain a host name of the source VM from the source VM from the source cloud platform; and
- obtain a host name of the destination VM from the destination cloud platform.

\* \* \* \* \*